Oct. 13, 1931.  J. KUBLER  1,826,794

ELECTRICAL TRANSFORMER

Filed April 20, 1929

Inventor
Johannes Kubler
By Alfred H. Dyson
Attorney.

Patented Oct. 13, 1931

1,826,794

UNITED STATES PATENT OFFICE

JOHANNES KUBLER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRICAL TRANSFORMER

Application filed April 20, 1929, Serial No. 356,653, and in Germany April 30, 1928.

This invention relates to circuits for producing an equal distribution of electric current and, more particularly, to a transformer construction whereby a plurality of circuits may be equally supplied with energy transmitted by the transformer.

When a plurality of electric current rectifiers of the metallic vapor type or a plurality of parallel operating anodes in the same rectifier were to be supplied with current, it was customary to supply each anode from a separate secondary winding of a transformer or to supply each rectifier from a separate transformer. It was then found that the secondary windings of a transformer might be distributed, in a side by side relation, over the primary winding in concentric coils thereby producing a practically equal distribution of current in each of the secondary windings as well as the same current relation in parallel operating anodes. Such distribution of windings over the primary was mechanically unsymmetrical and disconnection of one portion of the circuit or a short circuit was apt to produce current surges which caused axial thrusts in the transformer structure, especially in the case of short circuits, of such magnitude that the usual mechanical structure of the transformer was insufficient to avoid destruction thereof. A further disadvantage of such structure was that the secondary windings were arranged over the primary winding as concentric coils which produced half waves of different direction in the several coil portions so that the adjacent coils could not be connected to the same anode of a rectifier and the rectifier had a different voltage drop for current half waves of different direction.

The above disadvantages may be avoided if the secondary coils of a transformer are symmetrically arranged over the primary in such interleaved relation that the coils supplying the same anode carry current of the same value. Even if a short circuit should occur when the secondary coils are so distributed or interleaved over the primary, it will be found that the magnetic forces produced will counterbalance or neutralize each other in such manner that strains on the mechanical structure of the transformer will be neutralized or, at least, materially reduced.

It is, therefore, among the objects of the present invention to provide a transformer having a secondary coil arrangement which will produce an equal distribution of the energy to the several portions of the circuit to be supplied therefrom.

A further object of the present invention is to provide a transformer structure in which the secondary is divided into a plurality of coils so arranged and distributed over the primary thereof that the magnetic forces occurring therein, because of short circuits or similar disturbances, will be neutralized or balanced between the coils.

A further object of the present invention is to provide a transformer having a divided interleaved secondary coil arrangement in which each of the portions of the circuit to be supplied is connected with more than one of the coil portions of the transformer secondary.

Objects and advantages, other than those above set forth, will be apparent from the following description and from the drawings in which.

Figure 1:
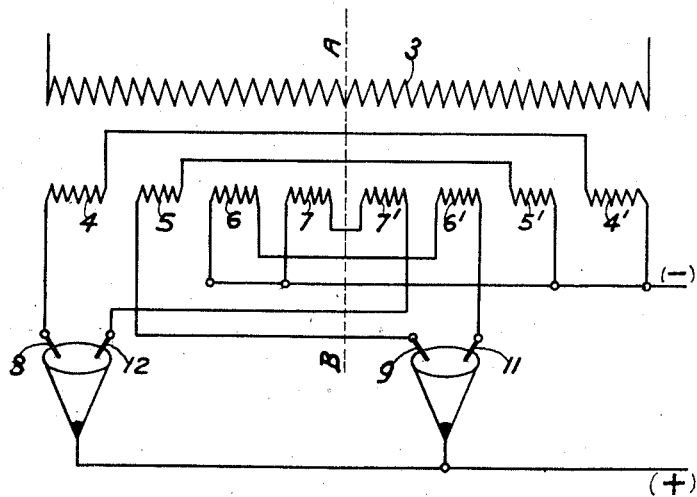
Figure 1 is a diagrammatic representation of a transformer embodying the present invention shown as supplying parallel operating anodes of electric current rectifiers.

Referring more specifically to the drawings by characters of reference, reference numeral 3 indicates the primary winding of a transformer and reference numerals 4, 5, 6, 7 and 4', 5', 6', 7' indicate the secondary winding of the transformer divided into a plurality of coils arranged over the entire primary winding.

The individual coils of each pair of coils 4, 4'; 5, 5'; 6, 6'; 7, 7' are connected in series and are arranged to supply current to one portion of an electric circuit such as an anode of an electric current rectifier. The coils 4, 4' are connected to anode 8, the coils 5, 5' are connected to anode 9, the coils 6, 6' are connected to anode 11 and the coils 7, 7' are connected to anode 12. For the sake of simplicity, a single phase arrangement has been chosen to illustrate the invention but it will be understood that the invention may be applied, without any material changes, to any multi-phase system by forming each leg of the transformer as herein described. If the direction of current flow is considered as being from the anodes to the cathodes of the rectifiers, the direction of current flow in coils 4, 4' and 5, 5' will be the same and opposed to that of coils 7, 7' and 6, 6' so that current half waves of different direction will be present in the several groups of coils and one set of coils and anodes will be without current while the other set is carrying current.

Figure 2:
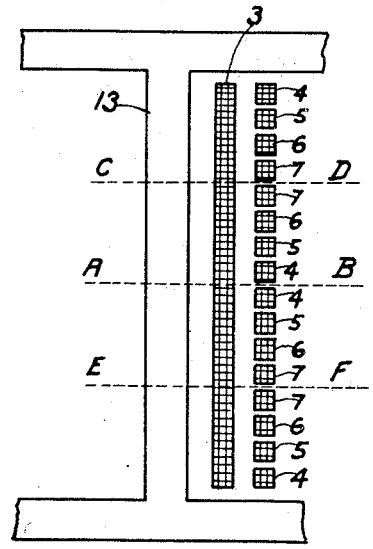
Fig. 2 is a fragmentary cross-sectional view showing a further improvement in the arrangement of the primary and secondary windings of a transformer embodying the invention.

It will be seen from the drawings that each pair of coils is arranged in the said relation with respect to a central plane A—B through the center of the transformer and reference to Fig. 2 of the drawings, in which the two halves of the core 13 are divided by planes C—D and E—F, will show that the coils of the secondary are symmetrically arranged with respect to the plane dividing each half of the core. Such further subdivision of the coils and the interleaved arrangement thereof in symmetrical relation with the half leg planes of symmetry C—D and E—F produces a further neutralization of the magnetic forces tending to stress the transformer construction.

The axial thrusts of the winding, as the result of the magnetic forces produced by short circuits or similar disturbances within the transformer or rectifier, will be off-set by the action of the coils on each other because of the symmetrical arrangement thereof on the core of the transformer. The inductive coupling of the secondary windings which carry current at the same moment and have a relatively large flux leakage, produce a fixed current relation over the entire transformer in such manner that it is immaterial whether or not the anodes operating in parallel are portions of the same or of different rectifiers.

Although but one embodiment of this invention has been illustrated and described, it will be understood that various other embodiments are possible, and that various changes may be made without departing from the spirit of the invention or the scope of the claims.

The invention claimed is:

1. In an electric transformer for supplying rectifier anodes working in parallel, a primary winding, and a secondary winding divided into a plurality of coils arranged symmetrically relative to a central plane perpendicular to the primary winding for substantially neutralizing magnetic forces acting on said primary on occurrence of rectifier short-circuit conditions.

2. In an electric transformer for supplying rectifier anodes working in parallel, a primary winding, and a secondary winding divided into a plurality of coils arranged symmetrically to perpendicular planes dividing the primary winding into a plurality of portions for substantially neutralizing magnetic forces acting on said primary on occurrence of rectifier short-circuit conditions.

3. In an electric transformer for supplying rectifier anodes working in parallel, a primary winding, and a secondary winding divided into a plurality of coils arranged symmetrically to perpendicular planes dividing the primary winding into a plurality of equal portions for substantially neutralizing magnetic forces acting on said primary on occurrence of rectifier short-circuit conditions.

4. In an electric transformer, for supplying rectifier anodes working in parallel, a single primary winding, and a secondary winding divided into a plurality of coils connected in groups and arranged symmetrically to planes dividing the primary winding into a plurality of equal portions for substantially neutralizing magnetic forces acting on said primary on occurrence of rectifier short-circuit conditions.

5. In an electrical transformer comprising a primary winding and a plurality of secondary windings subject to abnormal currents creating mechanical strains, of means for neutralizing said strains comprising dividing each said secondary winding into sections and arranging same symmetrically relative to a plane through the electrical center of said primary winding.

6. In an electrical transformer comprising a primary winding and a plurality of secondary windings, each said secondary winding comprising an element of a separate supply circuit subject to the flow of abnormal current therethrough, and the creation of excessive mechanical strains, and means compensating said strains comprising dividing each said secondary winding into a plurality of sections and arranging such sections of each winding symmetrically relative to planes intersecting the axis of and dividing the primary winding into a plurality of equal portions.

In testimony whereof I have hereunto subscribed my name this 22nd day of March A. D. 1929.

JOHANNES KUBLER.